United States Patent
Senzaki et al.

(10) Patent No.: US 7,098,268 B2
(45) Date of Patent: Aug. 29, 2006

(54) RESIN COMPOSITION

(75) Inventors: Toshihide Senzaki, Fukuoka (JP); Takahiro Imamura, Fukuoka (JP)

(73) Assignee: Nippon Steel Chemical Co., Ltd., Tokyo (JP)

( * ) Notice: Subject to any disclaimer, the term of this patent is extended or adjusted under 35 U.S.C. 154(b) by 361 days.

(21) Appl. No.: 10/485,531

(22) PCT Filed: Aug. 1, 2002

(86) PCT No.: PCT/JP02/07865

§ 371 (c)(1),
(2), (4) Date: Feb. 2, 2004

(87) PCT Pub. No.: WO03/014223

PCT Pub. Date: Feb. 20, 2003

(65) Prior Publication Data

US 2004/0214967 A1 Oct. 28, 2004

(30) Foreign Application Priority Data

Aug. 2, 2001 (JP) ............................. 2001-235168

(51) Int. Cl.
  *C08K 5/06* (2006.01)
  *C08L 9/06* (2006.01)
  *C08L 61/18* (2006.01)
(52) U.S. Cl. ...................... 524/593; 524/552; 524/571; 524/574; 524/575; 524/575.5; 524/594
(58) Field of Classification Search ...................... None
See application file for complete search history.

(56) References Cited

U.S. PATENT DOCUMENTS 4,424,255 A * 1/1984 Nakamura et al. .......... 442/417
6,523,590 B1 * 2/2003 Meier et al. ................. 152/525
6,713,591 B1 * 3/2004 Senzaki et al. ............. 528/129

FOREIGN PATENT DOCUMENTS

| GB | 1409021 A | * | 10/1975 |
|----|-----------|---|---------|
| JP | 57-126831 A | * | 8/1982 |
| JP | 07-041643 A1 | | 2/1995 |
| JP | 07-090130 A1 | | 4/1995 |
| JP | 10-081787 A1 | | 3/1998 |
| WO | WO-01/16199 A1 | | 3/2001 |

OTHER PUBLICATIONS

Derwent accession No. 1995-176472 and Caplus accession No. 2000:211099 for Romanian Patent No. 108,557 B1, Gruia et al., Jun. 30, 1994.*
Caplus accession No. 1995:643705 for Japanese Patent No. 7-90130 A, Sato et al., Apr. 4, 1995.*

* cited by examiner

*Primary Examiner*—Robert Sellers
(74) *Attorney, Agent, or Firm*—Reder, Fishman & Grauer PLLC

(57) ABSTRACT

This invention relates to a resin composition useful as a vibration-damping agent and the like. The resin composition is formulated by adding 1 wt % or more of styrenated phenol obtained by the reaction of a phenol with styrene to a polycyclic aromatic oligomer obtained by condensing a polycyclic aromatic compound containing 2 to 3 rings and formaldehyde. The polycyclic aromatic oligomer is obtained by the reaction of a polycyclic aromatic compound with formaldehyde and, if necessary, further with a phenol in the presence of an acid catalyst and has a number average molecular weight of 300–1000. The styrenated phenol is obtained by the reaction of 1 mole of a phenol with 1–2.5 moles of styrene in the presence of an acid catalyst.

4 Claims, 1 Drawing Sheet

RESIN COMPOSITION

FIELD OF TECHNOLOGY

This invention relates to a resin composition useful as a modifier or an additive in the industrial sectors of electronic parts (heat-resistant materials and thermal insulators) and automobiles (coatings, sealants, underbody coatings and thermal insulators). Furthermore, this invention relates to a resin composition useful as a vibration-damping agent that is required for the places where vibration and noise cause problems such as construction materials, electrical appliances, automobiles, bridges, motors, power generators and engines.

BACKGROUND TECHNOLOGY

A variety of methods are proposed for controlling the vibration damping property by the use of hydrocarbon resins; for example, commercial petroleum resins and coumarone-indene resins in JP63-11980 A and JP62-141069 A, commercial polybutene, terpene resin and modified rosin in JP2-49063 A and polycyclic aromatic resins or alkylbenzene-methylnaphthalene resins in JP7-90130 A.

A vibration-damping agent is incorporated in a base material such as rubber, resin and bitumen as an improver of the vibration-damping property and the resulting damping material is expected to show a large loss factor (tan δ) in the use range and minimal dependence of tan δ on temperature. However, these properties are often known to be contradictory.

The official gazette of WO01/16199 gives a description of a method for preparing polycyclic aromatic oligomers by the condensation reaction of a polycyclic aromatic compound containing 2 to 3 rings, a phenol and formaldehyde in the presence of an acid catalyst and also gives a description to the effect that the oligomers thus prepared are excellent vibration-damping agents.

DISCLOSURE OF THE INVENTION

An object of this invention is to provide a vibration-damping agent that manifests a good vibration-damping performance in a wide temperature range and is easy to obtain. Another object of this invention is to provide a resin composition useful as an additive to resins.

The resin composition of this invention comprises at least one kind of a) polycyclic aromatic oligomer selected from a group of a1) condensation oligomer of a polycyclic aromatic compound containing 2 to 3 rings and a2) condensation oligomer of a polycyclic aromatic compound containing 2 to 3 rings, a phenol and formaldehyde and 1 wt % or more of b) styrenated phenol obtained by the reaction of a phenol with styrene.

The resin composition of this invention comprises a) polycyclic aromatic oligomer and b) styrenated phenol. The polycyclic aromatic oligomer normally occurs as a mixture unless pure raw materials are used. In this specification, the percent purity or concentration is percent by weight unless otherwise specified. The constituents of aromatic oligomer refer to the unit or radical of monomers such as naphthalene and phenol existing in the oligomer, but such unit or radical is simply referred to as naphthalene or phenol for the sake of simplifying explanation.

The polycyclic aromatic oligomer occurs as a1) condensation oligomer of a polycyclic aromatic compound containing 2 to 3 rings and formaldehyde, a2) condensation oligomer of a polycyclic aromatic compound containing 2 to 3 rings, a phenol and formaldehyde or a mixture of the two. The polycyclic aromatic oligomer of this invention can be obtained by the reaction of a polycyclic aromatic compound containing 2 to 3 rings with formaldehyde and, if necessary, further with a phenol in the presence of an acid catalyst.

Some raw materials for polycyclic aromatic hydrocarbons containing 2 to 3 rings are mainly composed of naphthalene, methylnaphthalene, anthracene and the like, preferably 80 wt % or more of such polycyclic aromatic hydrocarbons. Raw materials of this kind variously consist of naphthalene, methylnaphthalene or anthracene alone, a mixture of these aromatic hydrocarbons or a mixture of these aromatic hydrocarbons with 50% or less, preferably 20% or less, of other aromatic hydrocarbons. Examples of polycyclic aromatic compounds containing 2 to 3 rings are monomethylnaphthalene, dimethylnaphthalene, acenaphthene, fluorene and phenanthrene. Naphthalene, monomethylnaphthalene and dimethylnaphthalene are preferable and naphthalene is more preferable.

In the case of naphthalene, a material with a purity of 90–100% is preferable and other aromatic compounds such as methylnaphthalene may be contained in a small amount. Aromatic hydrocarbon oil useful as a raw material for naphthalene may be either a high-purity material containing 90% or more of naphthalene or aromatic hydrocarbon oil mainly containing naphthalene. Aromatic hydrocarbon oil of this kind is available as a naphthalene fraction, methylnaphthalene fraction or intermediate fraction of coal tar or as an intermediate product or residual oil obtained in the recovery of the main components by distillation of the aforementioned fractions.

Aromatic hydrocarbon oil with a naphthalene content of 90% or more naturally contains aromatic hydrocarbons as main components, but it may additionally contain aromatic compounds containing hetero atoms such as N, S and O in the ring, aromatic compounds having functional groups containing such hetero atoms and inert aliphatic hydrocarbons. Unrefined aromatic hydrocarbon oil may contain a phenol and such phenol is calculated as part of reactant phenol.

Aromatic hydrocarbon oil containing 90% or more of naphthalene may be refined naphthalene, but a preferred material is 95% grade naphthalene which contains other components such as benzothiophene and methylnaphthalene.

A raw material for formaldehyde may be any compound which generates formaldehyde in the reaction system and, although formaldehyde itself, formalin, paraformaldehyde and the like can be used, paraformaldehyde is used advantageously. Phenols to be used in the reaction with a2) polycyclic aromatic compound containing 2 to 3 rings and formaldehyde in the preparation of a condensation oligomer include phenol, alkylphenols such as cresol, xylenol and t-butylphenol, polyhydric phenols such as resorcin and pyrogallol and polycyclic aromatic hydroxy compounds such as naphthol. However, it is preferable to use phenol or a monohydric alkylphenol containing 1 to 6 carbon atoms from the standpoint of reactivity and the properties of oligomers.

Formaldehyde is required for raising the molecular weight of an aromatic oligomer and the conversion of an aromatic compound such as naphthalene. However, with the use of too much formaldehyde, there may arise the possibility of gelation taking place or terminal methylol groups remaining behind in large quantities. A phenol is effective for raising the molecular weight of an aromatic oligomer and, in addition, acts to provide a proper degree of polarity and improves tackiness to a metallic material; but an excessive use causes a loss of properties as hydrocarbon resins. A polycyclic aromatic compound improves the vibration-damping property, adjusts properly the polarity of aromatic oligomer and raises the miscibility with another resin such as SBR and a solvent.

The ratio of the raw materials or a polycyclic aromatic compound (A), a phenol (B) and formaldehyde (C) is as follows although it may vary somewhat with the content of other aromatic compounds: (C)/[(A)+(B)] (molar ratio) is 0.2—2.0, preferably 0.3–1.0, more preferably 0.4–0.9; (B)/(A) (weight ratio) is 0 or 0.01–0.99, preferably 0.02–0.95, more preferably 0.03–0.9; the amount of a compound generating formaldehyde in the reaction system was converted to an equivalent to formaldehyde in the calculation of molar ratio.

Whether it relates to the case of a1) polycyclic aromatic oligomer or to the case of a2) polycyclic aromatic oligomer, the ratio as constituents of oligomer varies somewhat with the reactivity of raw materials, ratio of raw materials and reaction conditions and the molar ratio (C)/[(A)+(B)] ranges 0.5 to 1 times the molar ratio of the raw materials and the weight ratio (B)/(A) ranges from 1 to 2 times the weight ratio of the raw materials in most cases. In consequence, the ratio as constituents of oligomer is 0.2–2.0, preferably 0.4–0.8, for the molar ratio (C)/[(A)+(B)] and 0 or 0.02–0.9, preferably 0.03–0.9, for the weight ratio (B)/(A).

A catalyst to be used in the reaction for preparing the aforementioned a) polycyclic aromatic oligomer is an acid; for example, an inorganic acid such as sulfuric acid, phosphoric acid and hydrochloric acid, an organic acid such as oxalic acid and toluenesulfonic acid and a solid acid such as silica-alumina, zeolite, ion exchange resin and acid clay and oxalic acid, toluenesulfonic acid or sulfuric acid is preferred. A catalyst which decomposes thermally like oxalic acid produces a beneficial effect of omitting the step for catalyst removal. The amount of catalyst to be used varies with the kind of acid catalyst, but it is generally 0.5–20 wt % of the reactants and it is preferably 5–10 wt % in the case of oxalic acid.

The reaction conditions vary with the raw materials and catalyst to be used, but the reaction is generally conducted at a temperature of 50–180° C. for a period of 0.5–5 hours. In this reaction, formaldehyde, a polycyclic aromatic compound containing 2 to 3 rings and a phenol react with one another and in the case where the phenol is present in a small amount or absent, the product is an oligomer resembling a hydrocarbon resin or a phenol-modified hydrocarbon resin. When the phenol is present in a large amount in the reaction system, the product is an oligomer like hydrocarbon-modified novolak resin. A solvent may be used if necessary.

Upon completion of the reaction, the reaction mixture is distilled to drive out low-boiling substances such as water and formaldehyde, then distilled under reduced pressure to drive out the unreacted raw materials and other fractions while raising the temperature to 200–250–300° C. The residue is a polycyclic aromatic oligomer. Upon completion of the reaction, the catalyst may be removed by washing with water or the like if necessary and the reaction stops here in that case. When the catalyst removal is not undertaken, the reaction progresses partly during distillation. In the case where naphthalene-containing oil is used in excess as an aromatic compound, it is possible to obtain refined naphthalene by such means as crystallization and washing from the naphthalene fraction that was recovered as the unreacted raw material.

The number average molecular weight of a) polycyclic aromatic oligomer obtained in the aforementioned manner is preferably in the range of 300–1000 while the weight average molecular weight is in the range of 500–2000 and the ratio of the two is in the range of 1.5–3. Moreover, this polycyclic aromatic oligomer has a softening point in the range of 50–180° C., preferably in the range of 70–120° C. When the softening point is too low or too high, the temperature range where a good vibration-damping performance is manifested deviates from the common use temperature range or the miscibility deteriorates.

Another component or b) styrenated phenol to be incorporated in the resin composition of this invention may be any one of monostyrenated phenol, distyrenated phenol, tristyrenated phenol and mixtures of polystyrenated phenols and they can be synthesized by known methods or commercial products may be used. Preferable styrenated phenol is the one which is obtained by treating phenol or an alkylphenol containing 1–6 carbon atoms with 1.0–2.5 times, preferably 1.5–2.5 times, as much styrene as the phenol on a molar basis in the presence of an acid catalyst and which is a liquid of low viscosity at room temperature. Moreover, styrenated phenol may be used as synthesized or after purification or molecular weight fractionation.

The ratio of a) polycyclic aromatic oligomer to b) styrenated phenol in formulating the resin composition of this invention is 99:1, preferably 5:95 to 95:5, more preferably 50:50 to 90:10.

The resin composition of this invention comprises the aforementioned polycyclic aromatic oligomer and styrenated phenol and it may be used as a vibration-damping agent, an additive for modification of resins and the like.

The vibration-damping agent of this invention comprises the resin composition of this invention as an active ingredient that provides a vibration-damping material with vibration-damping properties and it is incorporated in a damping material such as resin, rubber, and bitumen. It is possible in this step to incorporate other known vibration-damping agents, fillers such as carbon black, calcium carbonate, titanium oxide, clay, talc, mica and alumina and a variety of additives such as process oil and antioxidants in addition to the vibration-damping agent of this invention.

It is advantageous to incorporate 10–70 wt %, preferably 30–60 wt %, of the vibration-damping agent of this invention in rubber such as SBR, butyl rubber, natural rubber, diene rubber, chloroprene and modifications thereof by hydrogenation. When used in combination with other vibration-damping agents, the vibration-damping agent of this invention can improve the shortcomings of such other vibration-damping agents.

PREFERRED EMBODIMENTS OF THE INVENTION

Figure 1:
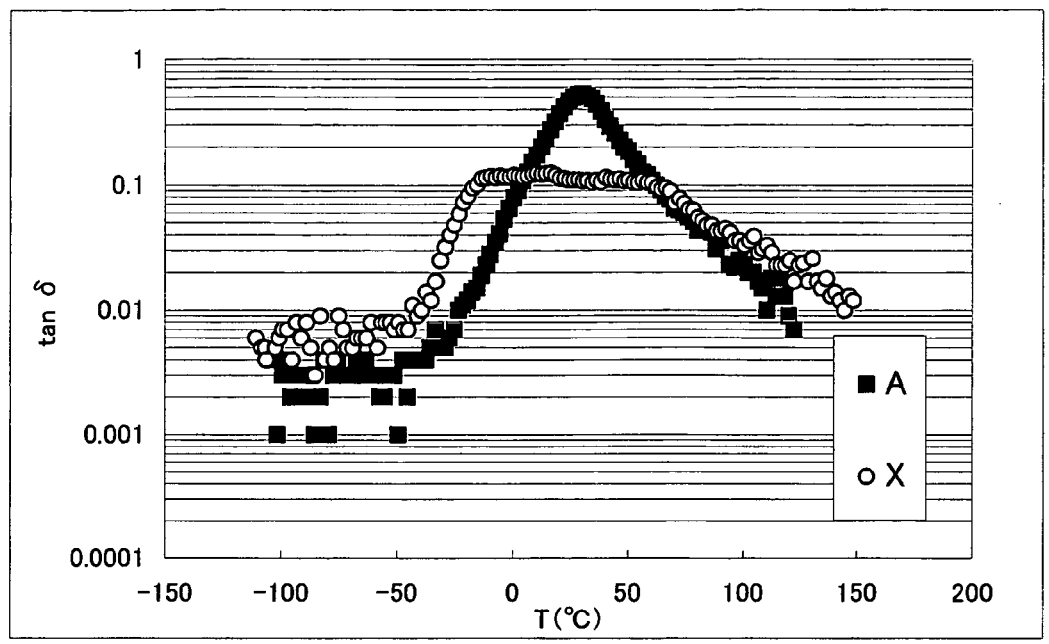
FIGS. 1 and 2 are graphs illustrating the relationship between tan δ and temperature (T) when the resin composition of this invention is used as a vibration-damping agent.

This invention is described below with reference to the accompanying examples. In the examples, % is % by weight and part is part by weight.

EXAMPLE 1

In a flask were placed 135 parts of coal-derived crude naphthalene (naphthalene content 96%), 68 parts of p-tert-butylphenol and 37 parts of 88% paraformaldehyde, the mixture was kept at 110° C. and 23 parts of oxalic acid was added. The mixture was then allowed to react at 130° C. for 2.5 hours with stirring to give an oligomer. The low-boiling substances such as water formed were refluxed.

Upon completion of the reaction, a condenser was attached to the flask and the reaction mixture was distilled at normal pressure. The low-boiling substances such as water and formaldehyde distilled by the time the temperature reached 200° C. The distillation was carried out at 50 mmHg from 200° C. to 270° C. to distill the unreacted raw materials. The fraction of the recovered raw material amounted to 66 parts and the residual resin was an aromatic oligomer having a softening point of 110° C. and amounting to 120 parts.

For the synthesis of styrenated phenol, 100 parts of phenol and 150 parts of toluene were placed in a flask, the mixture was kept at 80° C. and 3 parts of boron trifluoride was added. The reaction was carried out at 80° C. for 2 hours by adding 200 parts of styrene in drops to the mixture with stirring. Upon completion of the reaction, the catalyst was quenched by adding water. Thereafter, a condenser was attached to the flask and the reaction mixture was distilled at normal pressure. After distillation of the toluene, the unreacted phenol was recovered. The residual resin was styrenated phenol and amounted to 299 parts.

Resin composition A was prepared by mixing 90 parts of the aromatic oligomer and 10 parts of the styrenated phenol and measured for the vibration-damping performance.

A 1:1 mixture by weight of resin composition A and ethylene-vinyl acetate copolymer or EVA (Evaflex 220, available from DuPont-Mitsui Polychemicals Co., Ltd.) was dissolved in THF. A small spring (outer diameter 5 mm, length 29 mm) was impregnated with the THF solution and dried at room temperature for 24 hours to form film of a mixture of the resin and rubber in the gaps of the spring. A specimen was prepared in this manner for evaluation of the vibration-damping performance by Dynamic Spring Analysis (DSA).

The viscoelasticity of the specimen was measured in the temperature range from −110° C. to 150° C. with the aid of a measuring apparatus (RHEOBIBRON DDV-·-EP, available from Orientec Co., Ltd.).

EXAMPLE 2

In a flask were placed 250 parts of coal-derived crude naphthalene, 10 parts of cresol and 50 parts of 88% paraformaldehyde and a condenser was attached to the flask. The mixture was kept at 100° C., 60 parts of 70% sulfuric acid was added in drops and the mixture was allowed to react at 120° C. for 3 hours with stirring to give an oligomer.

Upon completion of the reaction, 40 parts of toluene was added, the mixture was left standing at 80° C. for 1 hour and the lower aqueous layer was separated. The organic layer was neutralized, washed and distilled at normal pressure. The low-boiling substances such as water and formaldehyde distilled by the time the temperature reached 200° C. The distillation was carried out at 50 mmHg from 200° C. to 270° C. to distill the unreacted raw materials. The residual resin was an aromatic oligomer with a softening point of 80° C. and amounted to 220 parts.

Resin composition B was prepared by mixing 90 parts of the oligomer thus obtained and 10 parts of the styrenated phenol synthesized in Example 1 and measured for the vibration-damping performance.

Furthermore, a 1:1 mixture by weight of resin composition B and SBR (Tufprene A, available from Asahi Kasei Corporation) was used to prepare a specimen for evaluation of the vibration-damping performance as in Example 1 and the viscoelasticity was measured.

EXAMPLES 3–6

Resin compositions C, D, E and F were prepared by mixing the aromatic oligomer obtained in Example 2 and the styrenated phenol obtained in Example 1 at the ratios shown in Table 1.

A 1:1 mixture by weight of the respective resin composition and SBR (Tufprene A) was used to prepare a specimen for evaluation of the vibration-damping performance and the specimen was measured for the vibration-damping performance. The maximum peak value of tan δ and the corresponding temperature are shown in Table 1.

COMPARATIVE EXAMPLE 1

A specimen for evaluation of the vibration-damping performance was prepared from EVA (Evaflex 220) without using the aromatic oligomer and the specimen was measured for the vibration-damping performance as in Example 1.

COMPARATIVE EXAMPLE 2

A specimen for evaluation of the vibration-damping performance was prepared from SBR (Tufprene) without using the aromatic oligomer and the specimen was measured for the vibration-damping performance as in Example 1.

Figure 2:
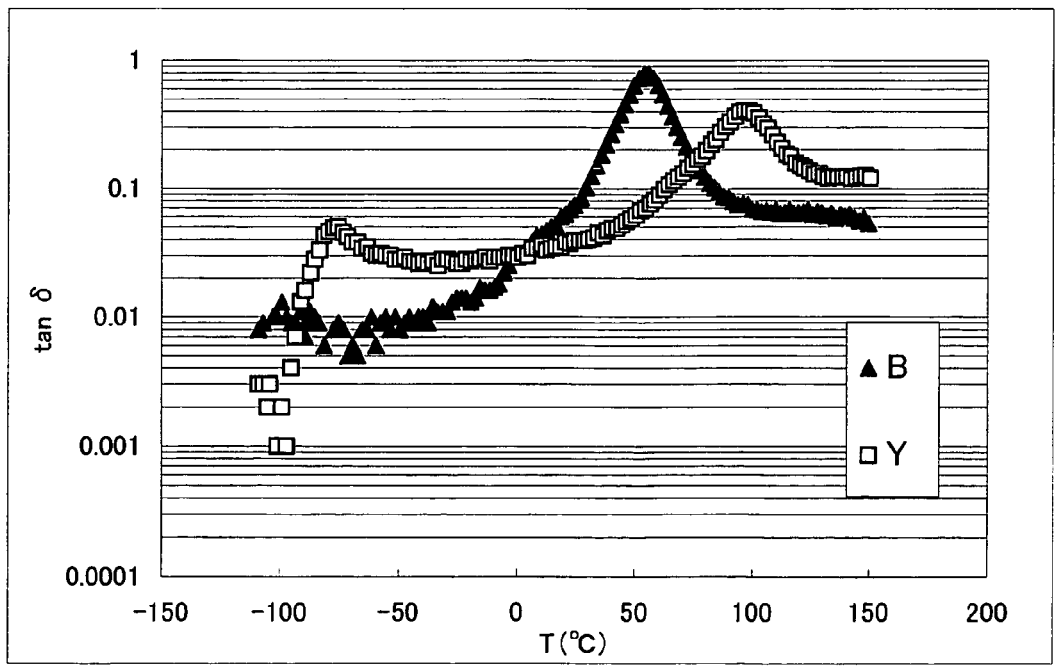

The viscoelasticity was measured on the evaluation specimens of Examples 1 and 2 and Comparative Examples 1 and 2 in the temperature range from −110° C. to 150° C. The results are shown in FIGS. 1 and 2 as plots of tan δ vs. temperature (T). In FIG. 1, A refers to the results of Example 1 and X to those of Comparative Example 1. In FIG. 2, B refers to the results of Example 2 and Y to those of Comparative Example 2.

Furthermore, the maximum peak value of tan δ and the corresponding temperature determined on the evaluation specimens of Examples 2 to 6 and Comparative Example 2 are shown in Table 1.

As illustrated in FIG. 1, EVA alone (X) of Comparative Example 1 shows a gently-sloping peak of tan δ equal to 0.120 in the temperature range from −5.2° C. to 16.8° C. On the other hand, the mixture of EVA and resin composition A of Example 1 shows a sharp peak of tan δ equal to 0.530 at 30.6° C. and this proves that resin composition A has provided EVA with vibration-damping properties.

As illustrated in FIG. 2, in the system involving SBR, SBR alone (Y) of Comparative Example 2 shows a small peak of tan δ equal to 0.050 at −75.4° C. and a large peak of tan δ equal to 0.405 at 96.5° C.

Moreover, as is apparent from Table 1, the peak of tan δ increases sharply or a good vibration-damping performance is obtained by the use of the resin composition of this invention.

In this manner, the vibration-damping range can be controlled by properly selecting a polycyclic aromatic oligomer composition.

TABLE 1

| | Resin composition | Aromatic oligomer (%) | Styrenated phenol (%) | tan δ | Temperature (° .C) |
|---|---|---|---|---|---|
| Example 2 | B | 90 | 10 | 0.789 | 55.9 |
| Example 3 | C | 80 | 20 | 0.770 | 52.6 |
| Example 4 | D | 70 | 30 | 0.754 | 46.1 |
| Example 5 | E | 60 | 40 | 0.690 | 44.7 |
| Example 6 | F | 50 | 50 | 0.640 | 43.5 |
| Comparative example 2 | | — | — | 0.405 | 96.5 |

INDUSTRIAL APPLICABILITY

The resin composition of this invention is useful as a vibration-damping agent and the like and provides excellent vibration-damping properties.

What is claimed is:

1. A resin composition which comprises at least one kind of a) polycyclic aromatic oligomer selected from the group consisting of a1) condensation oligomer of a polycyclic aromatic compound containing 2 to 3 rings and formaldehyde and a2) condensation oligomer of a polycyclic aromatic compound containing 2 to 3 rings, a phenol and formaldehyde, and b) 10 wt % or more of styrenated phenol obtained by the reaction of a phenol with styrene.

2. A resin composition as described in claim 1 wherein the ratio by weight of a) polycyclic aromatic oligomer to b) styrenated phenol is 50:50–90:10.

3. A vibration-damping agent comprising the resin composition described in claim 1 or 2 as an active ingredient.

4. A resin composition as described in claim 1 wherein the polycyclic aromatic compound is naphthalene.

* * * * *